(12) United States Patent
Das et al.

(10) Patent No.: US 9,811,420 B2
(45) Date of Patent: Nov. 7, 2017

(54) EXTRACTING SELECTIVE INFORMATION FROM ON-DIE DYNAMIC RANDOM ACCESS MEMORY (DRAM) ERROR CORRECTION CODE (ECC)

(71) Applicant: Intel Corporation, Santa Clara, CA (US)

(72) Inventors: Debaleena Das, Los Gatos, CA (US); Bill Nale, Livermore, CA (US); Kuljit S Bains, Olympia, WA (US); John B Halbert, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 14/670,413

(22) Filed: Mar. 27, 2015

(65) Prior Publication Data

US 2016/0283318 A1 Sep. 29, 2016

(51) Int. Cl.
*G06F 11/00* (2006.01)
*G06F 11/10* (2006.01)

(52) U.S. Cl.
CPC .......... *G06F 11/1084* (2013.01); *G06F 11/00* (2013.01); *G06F 11/1008* (2013.01); *G06F 11/1076* (2013.01)

(58) Field of Classification Search
CPC .... G06F 11/1008; G06F 3/0619; G06F 3/064; G06F 3/0673
See application file for complete search history.

(56) References Cited

U.S. PATENT DOCUMENTS

| 6,044,483 A | * | 3/2000 | Chen | G06F 11/1044 |
| | | | | 714/48 |
| 7,099,221 B2 | * | 8/2006 | Klein | G11C 7/20 |
| | | | | 365/222 |
| 8,255,620 B2 | * | 8/2012 | Frost | G06F 11/1068 |
| | | | | 711/103 |
| 8,484,542 B2 | * | 7/2013 | d'Abreu | G06F 11/1012 |
| | | | | 714/763 |
| 8,819,336 B2 | | 8/2014 | Kwon et al. | |

(Continued)

OTHER PUBLICATIONS

International Search Report and Written Opinion for PCT Patent Application No. PCT/US2016/021142, Mailed Mar. 7, 2016, 15 pages.

(Continued)

*Primary Examiner* — Esaw Abraham
(74) *Attorney, Agent, or Firm* — Compass IP Law PC

(57) ABSTRACT

Error correction in a memory subsystem includes a memory device generating internal check bits after performing internal error detection and correction, and providing the internal check bits to the memory controller. The memory device performs internal error detection to detect errors in read data in response to a read request from the memory controller. The memory device selectively performs internal error correction if an error is detected in the read data. The memory device generates check bits indicating an error vector for the read data after performing internal error detection and correction, and provides the check bits with the read data to the memory controller in response to the read request. The memory controller can apply the check bits for error correction external to the memory device.

16 Claims, 5 Drawing Sheets

(56) References Cited

U.S. PATENT DOCUMENTS

| | | | |
|---|---|---|---|
| 8,839,073 B2* | 9/2014 | Cohen | G06F 11/1012 365/185.03 |
| 9,032,269 B2* | 5/2015 | Sharon | G06F 11/1072 365/185.33 |
| 9,329,943 B2* | 5/2016 | Teli | G06F 11/1469 |
| 2009/0063923 A1 | 3/2009 | Gower et al. | |
| 2009/0070651 A1 | 3/2009 | Diggs et al. | |
| 2010/0262889 A1 | 10/2010 | Bains | |
| 2011/0154163 A1 | 6/2011 | Cornwell et al. | |
| 2012/0079342 A1 | 3/2012 | Lu et al. | |
| 2012/0216094 A1 | 8/2012 | Yoo et al. | |
| 2013/0024736 A1 | 1/2013 | Roohparvar et al. | |
| 2013/0268719 A1 | 10/2013 | Dover et al. | |
| 2013/0332798 A1 | 12/2013 | Keays et al. | |
| 2014/0047265 A1 | 2/2014 | Das et al. | |
| 2014/0075265 A1 | 3/2014 | Hung et al. | |
| 2014/0136926 A1 | 5/2014 | Radke et al. | |
| 2014/0181615 A1 | 6/2014 | Kwok | |
| 2014/0281808 A1 | 9/2014 | Lam | |
| 2015/0084971 A1 | 3/2015 | Dodge et al. | |
| 2016/0004452 A1 | 1/2016 | Hayes et al. | |
| 2016/0055056 A1 | 2/2016 | Son et al. | |
| 2016/0092307 A1 | 3/2016 | Bonen et al. | |

OTHER PUBLICATIONS

English Translation of Search Report of R.O.C. Patent Application No. 105104802, Received Feb. 20, 2017, 1 page.

* cited by examiner

EXTRACTING SELECTIVE INFORMATION FROM ON-DIE DYNAMIC RANDOM ACCESS MEMORY (DRAM) ERROR CORRECTION CODE (ECC)

FIELD

Embodiments of the invention are generally related to memory management, and more particularly to accessing only selected information from on-die error checking and correction from a memory device.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2015, Intel Corporation, All Rights Reserved.

BACKGROUND

Volatile memory resources find widespread usage in current computing platforms, whether for servers, desktop or laptop computers, mobile devices, and consumer and business electronics. DRAM (dynamic random access memory) devices are the most common types of memory devices in use. However, DRAM errors are projected to increase as the manufacturing processes to produce the DRAMs continue to scale to smaller geometries. One technique for addressing the increasing DRAM errors is to employ on-die ECC (error checking and correction). On-die ECC refers to error detection and correction logic that resides on the memory device itself. With on-die ECC logic, a DRAM can correct single bit failures, such as through a single error correction (SEC) or single error correction, dual error detection (SECDED) techniques. On-die ECC can be used in addition to system level ECC, but the system level ECC has no insight into what error correction has been performed at the memory device level. However, providing details of error correction performed by the DRAM would expose sensitive data about the design and operation of the DRAMs.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
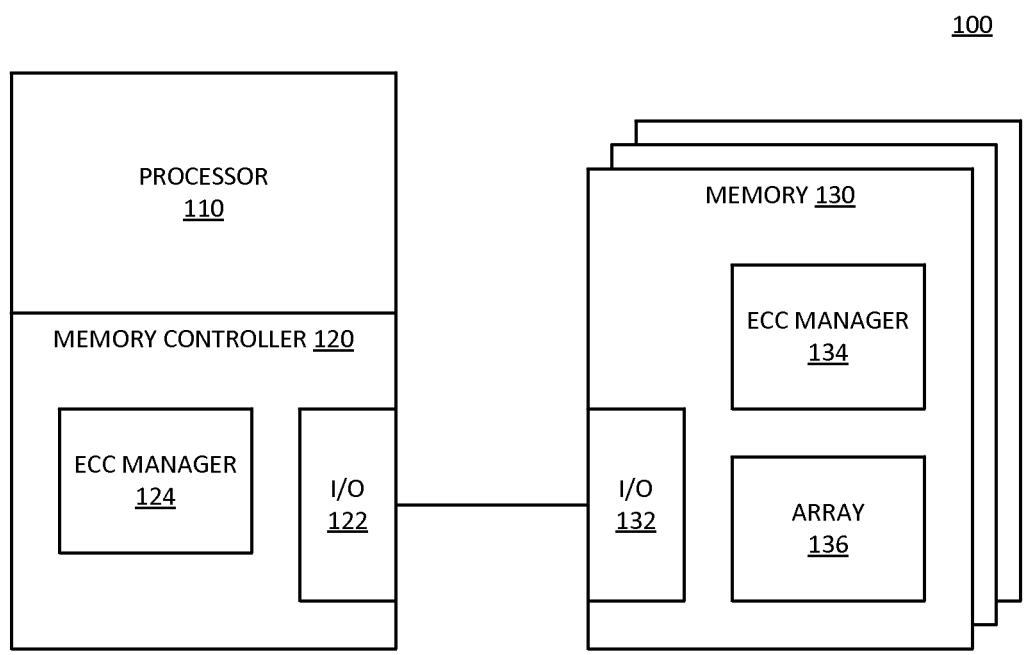
FIG. 1 is a block diagram of an embodiment of a system in which a memory device exposes internal ECC check bits to a host.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, error checking and correction (ECC) in a memory subsystem includes a memory device generating internal check bits after performing internal error detection and correction, and providing the internal check bits to the memory controller. The memory device performs internal error detection to detect errors in read data in response to a read request from the memory controller. The memory device selectively performs internal error correction if an error is detected in the read data. The memory device generates check bits indicating an error vector for the read data after performing internal error detection and correction, and provides the check bits with the read data to the memory controller in response to the read request. The check bits to send to the memory controller will show no errors if there are no errors or if a single error was corrected by the memory device. The check bits will show a multibit error detected by the memory device without indicating single bit error information for the memory device. The memory controller can apply the check bits for system level ECC external to the memory device.

There have been many improvements in reliability, accessibility, and serviceability (RAS) levels of memory subsystems. Providing access to internal ECC information is predicted to further improve system level ECC. However, providing access to internal correction data (erroneous bits) of a memory device reveals information about all corrections including single bit corrections. As described herein, a memory subsystem enables the exchange of internal check bits from the memory device, which can provide only selected information about corrections at the memory device level. Specifically, by generating check bits for corrected data, the memory device can provide check bits to the memory controller that will be indistinguishable for single bit error (SBE) conditions and no error conditions.

Thus, in one embodiment, the ECC described herein allows the memory device to pass ECC information to improve system level ECC without revealing private information. The ECC information passed can be referred to as post correction check bits. While the check bits for SBE will not reveal information about the memory device, check bits indicating multibit errors can be used by the memory controller to improve system ECC. The memory controller can extract the multibit error information from the check bits. The memory controller can apply the multibit information to determine how to apply ECC to the system (e.g., by knowing where errors occurred in the memory). In one embodiment, the memory controller uses the internal check bits from the memory device as metadata for improving SDDC (single device data correction) ECC operations targeting multibit errors.

Reference to memory devices can apply to different memory types. Memory devices generally refer to volatile memory technologies. Volatile memory is memory whose state (and therefore the data stored in it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), WIO3 (Wide I/O 3, currently in discussion by JEDEC), HBM2 (HBM version 2), currently in discussion by JEDEC), and/or others, and technologies based on derivatives or extensions of such specifications.

In addition to, or alternatively to, volatile memory, in one embodiment, reference to memory devices can refer to a nonvolatile memory device whose state is determinate even if power is interrupted to the device. In one embodiment, the nonvolatile memory device is a block addressable memory device, such as NAND or NOR technologies. Thus, a memory device can also include a future generation nonvolatile devices, such as a three dimensional crosspoint memory device, or other byte addressable nonvolatile memory device. In one embodiment, the memory device can be or include multi-threshold level NAND flash memory, NOR flash memory, single or multi-level Phase Change Memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

FIG. 1 is a block diagram of an embodiment of a system in which a memory device exposes internal ECC check bits to a host. System 100 represents components of a memory subsystem. System 100 can be included in any type of computing device or electronic circuit that uses memory with internal ECC. Processor 110 represents any type of processing logic or component that executes operations based on data stored in memory 130 or to store in memory 130. Processor 110 can be or include a host processor, central processing unit (CPU), microcontroller or microprocessor, graphics processor, peripheral processor, application specific processor, or other processor. Processor 110 can be or include a single core or multicore circuit.

Memory controller 120 represents logic to interface with memory 130 and manage access to data of memory 130. In one embodiment, memory controller 120 is integrated into the hardware of processor 110. In one embodiment, memory controller 120 is standalone hardware, separate from processor 110. Memory controller 120 can be a separate circuit on a substrate that includes processor 110. Memory controller 120 can be a separate die or chip integrated on a common substrate with a die having processor 110 (e.g., as a system on a chip (SoC)). In one embodiment, at least some if not all of memory 130 can be included on an SoC with processor 110 and/or memory controller 120.

Processor 110 is generally understood within the context of system 100 to generate requests for data from memory 130, and to consume the data returned from memory 130 in response to such requests. In one embodiment, processor 110 and memory controller 120 can together be considered a "host" for which memory 130 stores and returns data. In one embodiment, memory 130 includes only volatile memory resources. In one embodiment, memory 130 includes nonvolatile memory resources. In one embodiment, memory 130 includes DDR4 DRAMs that have internal ECC (which may be referred to in the industry as DDR4e).

In one embodiment, system 100 includes multiple memory resources 130. Memory 130 can be implemented in system 100 in any type of architecture that supports access via memory controller 120 with use of ECC. Memory 130 can be managed, for example, as different levels of memory with separate channels, DIMMs (dual inline memory modules), ranks, DRAMs, banks, pages, rows. Each separate memory level and resource can be individually addressable. Memory controller 120 includes I/O (input/output), which includes hardware resources to interconnect with corresponding I/O 132 of memory 130. I/O can include drivers, ODT (on die termination), pins, connectors, traces, pads, wires, and/or other hardware. I/O 122 and 132 are typically organized in one or more buses of signal lines, such as a command/address (C/A) bus for memory controller 120 to send access commands and address information, and a data bus to allow memory controller 120 and memory 130 to exchange data. The data is read from the different memory resources with a Read command or written to the memory resources with a Write command.

In one embodiment, memory controller includes ECC manager 124 to manage error checking and correction in memory accesses of system 100. In one embodiment, memory 130 includes internal ECC managed by ECC manager 134. ECC manager 124 of memory controller 120 manages system wide ECC, and can detect and correct errors across multiple different memory resources in parallel (e.g., multiple memory resources 130). Many techniques for system wide ECC are known, and can include ECC manager 124 managing memory resources in a way to spread errors across multiple resources. By spreading errors across multiple resources, memory controller 120 can recover data even in the event of one or more failures in memory 130. Memory failures are generally categorized as either soft errors or soft failures, which are transient bit errors typically resulting from random environmental conditions, or hard errors or hard failures, which are non-transient bit errors occurring as a result of a hardware failure.

ECC manager 134 of memory 130 manages one or more errors occurring in the memory resources of array 136. The use of ECC within memory 130 may be referred to as internal ECC or on-die ECC, or internal on-die ECC. In general, internal ECC refers to ECC implemented within memory 130, without command or management of the ECC operations by memory controller 120 or the host. Array 136 includes multiple rows of data, which can be one or more words wide. For memory 130 that implements ECC, array 136 includes spare memory resources used to internally map out failures to different physical resources. Thus, a failure in array 136 can be recovered by mapping the data to a different available memory resource and correcting the error. In one embodiment, ECC manager 134 implements SEC (single error correction) or SECDED (single error correction, double error detection) procedures or operations for data in array 136. Thus, memory 130 can return corrected data in place of data with an error.

In one embodiment, memory controller 120 can use information from the on-die ECC of memory device or devices 130 to augment system level ECC. If ECC within memory 130 is referred to as internal ECC, external ECC can refer to ECC outside a memory device 130. ECC manager 124 of the host manages external ECC. In one embodiment, ECC manager 124 can monitor the general health of an individual memory resource 130, such as the health of a DRAM device. It will be understood that full access by the host to internal ECC correction details would expose DRAM vendor failure data, which can include private data and/or other data that a DRAM manufacturer would otherwise not want to share.

In one embodiment, ECC manager 134 is configured to share selective information about internal ECC, which can provide information for use by the host without divulging failure data for each memory 130. In one embodiment, ECC manager 134 generates and provides access to check bits that provide information exclusively about multibit errors. By not revealing information about SBE failures, the failure data of memory 130 is not generally known, but the multibit failure information can still be used by the host to correct multibit errors resulting from hard failures (e.g., via SDDC ECC). In one embodiment, memory controller 120 can generate a Read command that triggers memory 130 to expose internal ECC check bits. For example, memory controller 120 can generate a two cycle Read command, with a Read command followed by a CAS (column address strobe) command. In one embodiment, memory controller 120 sets a higher order address bit to trigger memory 130 to expose the internal ECC check bits. For example, memory controller 120 could set Address bit 13 to a logic 1 (A13=1) to fetch ECC bits from a DRAM array. The logic value of a different address or control bit could alternatively be used. In one embodiment, the read latency of ECC bits will be set to be same as for read data to simplify the implementation of exchanging internal ECC information.

It will be understood that ECC manager 124 of memory controller 124 and ECC manager 134 of memory 130 can be or include error detection logic and error correction logic. Error detection logic refers to logic (such as hardware logic shown in FIG. 2) that detects errors in read data. Error detection logic of ECC manager 134 can detect errors in response to a read request from memory controller 120. Error correction logic refers to logic (such as hardware logic shown in FIG. 2) that corrects error in read data. Error correction logic of ECC manager 134 can correct an error in data read from array 136 in response to the read request. Error correction logic can be considered to operate selectively, since it only needs to correct errors if an error is detected. In one embodiment, the error detection logic can generate check bits indicating an error vector for the read data after performing internal error detection and correction. Thus, the check bits will indicate no error for data that has no errors, and no error for data that had an SBE that was corrected. The check bits can indicate a multibit error if such an error is detected, which provides information to memory controller 120 about multibit errors.

I/O 132 can selectively transmit the check bits to I/O 122 of memory controller 120 if the Read command indicates sending the bits. Otherwise, memory 130 could generate the internal ECC information without sending the information to the host. In one embodiment, ECC manager 124 of memory controller 120 is configured to use the check bits as metadata for an application of SDDC ECC on the data read from multiple memory devices 130 in parallel.

Figure 2:
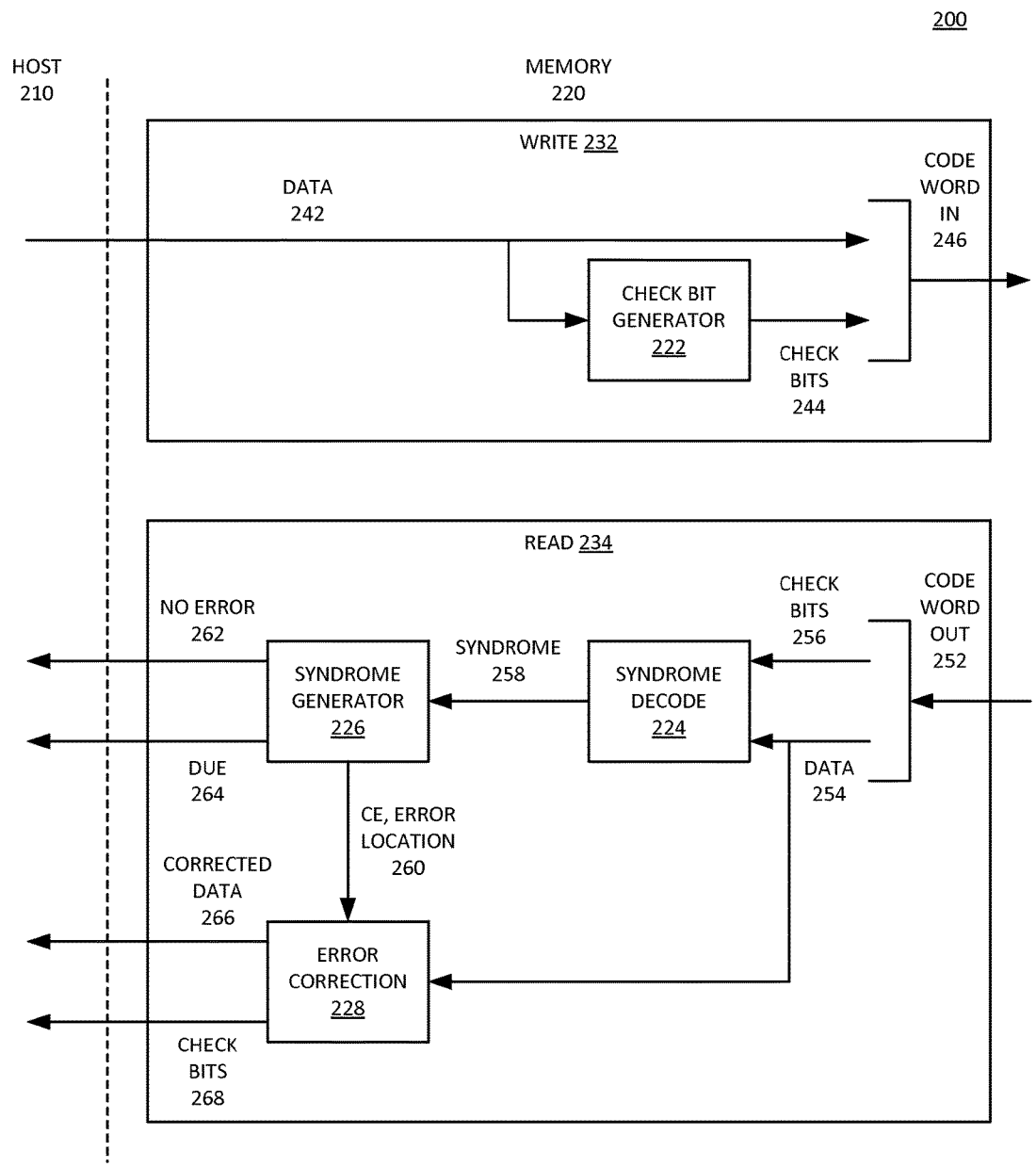
FIG. 2 is a block diagram of an embodiment of logic at a memory device that generates internal check bits to send to a host.

FIG. 2 is a block diagram of an embodiment of logic at a memory device that generates internal check bits to send to a host. System 200 is one example of a memory subsystem in accordance with system 100 of FIG. 1. Host 210 includes a memory controller or equivalent or alternative circuit or component that manages access to memory 220. Host 210 performs external ECC on data read from memory 220.

System 200 illustrates write path 232 in memory 220, which represents a path for data written from host 210 to memory 220. Host 210 provides data 242 to memory 220 for writing to the memory array(s). In one embodiment, memory 220 generates check bits 244 with check bit generator 222 to store with the data in memory. Check bits 244 can enable memory 220 to correct an error that might occur in the writing to and reading from the memory array(s). Data 242 and check bits 244 can be included as code word in 246, which is written to the memory resources.

Read path 234 represents a path for data read from memory 220 to host 210. In one embodiment, at least certain hardware components of write path 232 and read path 234 are the same hardware. In one embodiment, memory 220 fetches code word out 252 in response to a Read command from host 210. The code word can include data 254 and check bits 256. Data 254 and check bits 256 can correspond, respectively, to data 242 and check bits 244 written in write path 232. It will be understood that error correction in read path 234 can include the application of an XOR (exclusive OR) tree to a corresponding H matrix to detect errors and selectively correct errors (in the case of a single bit error). As is understood in the art, an H matrix refers to a hamming code parity-check matrix that shows how linear combinations of digits of the codeword equal zero. Thus, the H matrix rows identify the coefficients of parity check equations that must be satisfied for a component or digit to be part of a codeword. In one embodiment, memory 220 includes syndrome decode 224, which enables the memory to apply check bits 256 to data 254 to detect errors in the read data. Syndrome decode 224 can generate syndrome 258 for use in generating appropriate error information for the read data. Data 254 can also be forwarded to error correction 228 for correction of a detected error.

In one embodiment, syndrome decode 224 passes syndrome 258 to syndrome generator 226 to generate an error vector. In one embodiment, check bit generator 222 and syndrome generator 226 are fully specified by a corresponding H matrix for the memory device. In one embodiment, if there are no errors in the read data (e.g., zero syndrome 258), syndrome generator 226 generates a no error signal 262. In one embodiment, if there are multiple errors in the read data (e.g., non-zero syndrome 258 that does not match any of the columns in a corresponding H matrix), syndrome generator 226 generates a DUE (detected uncorrected error) signal 264, which indicates a detected, uncorrected error. DUE signal 264 can indicate a multibit error that memory 220 was not able to correct by internal ECC.

In one embodiment, if there is a single bit error (e.g., non-zero syndrome 258 that matches one of the columns of a corresponding H matrix), syndrome generator 226 can generate a CE (corrected error) signal with error location 260, which is a corrected error indication to error correction logic 228. Error correction 228 can apply the corrected error to the specified location in data 254 to generate corrected data 266 for output to host 210. In one embodiment, error correction 228 also generates check bits 268, which includes the check bits for the read data.

Check bits 268 can be considered an error vector that indicates a state of errors in the read data transmitted to host 210. It will be understood that zero syndrome (no error 262) condition and a corrected SBE resulting in corrected data 266 will have the same check bits 268, indicating no error to host 210. Thus, check bits 268 will not provide information about SBE in memory 220, but only multibit errors.

Figure 3:
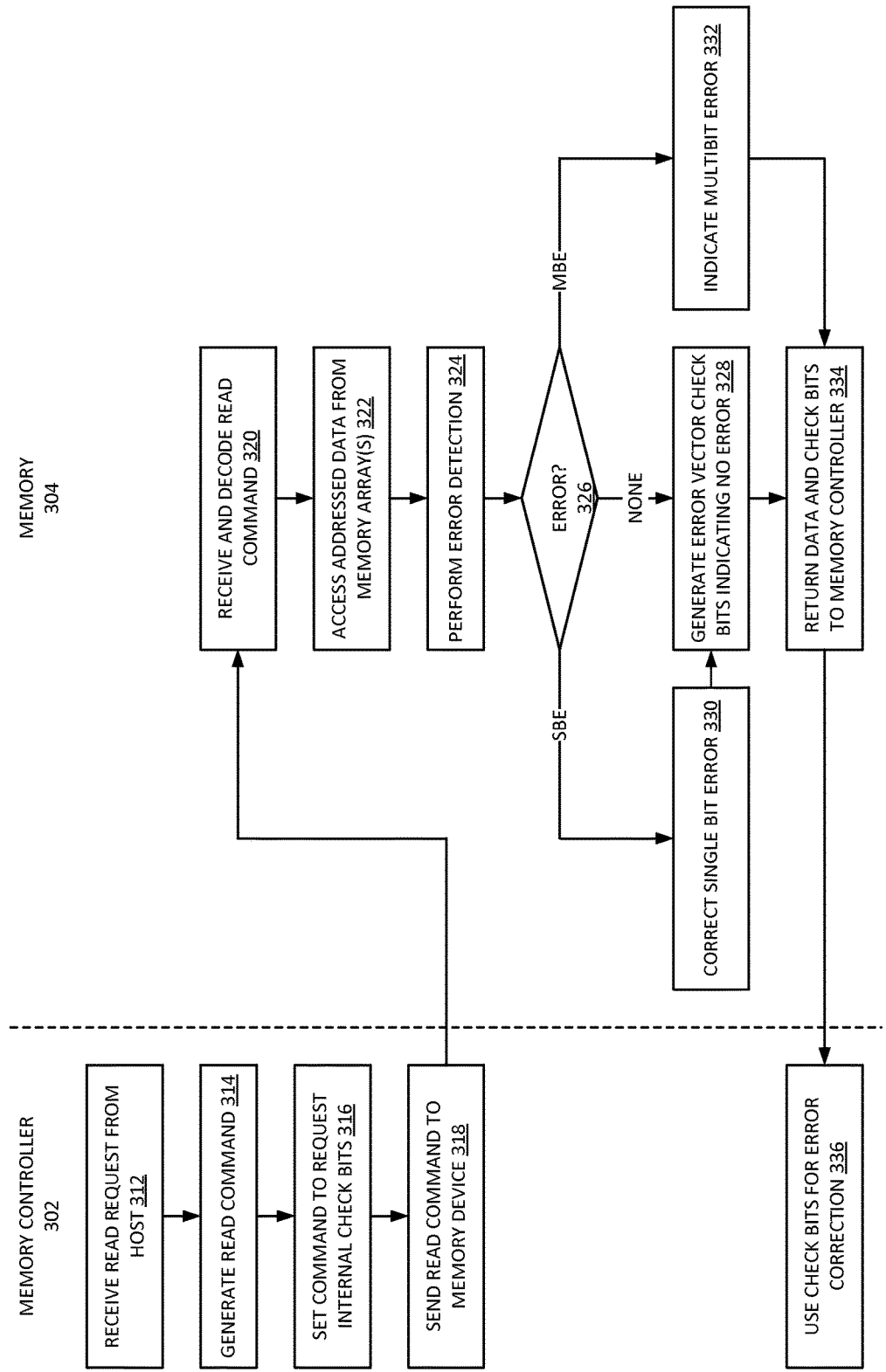
FIG. 3 is a flow diagram of an embodiment of a process for performing error correction including sending internal check bits from a memory device to a host.

FIG. 3 is a flow diagram of an embodiment of a process for performing error correction including sending internal check bits from a memory device to a host. The process illustrated can be a process performed by a memory subsystem in accordance with any embodiment described herein. More specifically, the flow diagram illustrates operations for memory controller 302 and for memory 304. Generally, memory controller 302 generates and sends a read request to memory 304. Memory 304 returns data and check bits in response to the read request.

In one embodiment, memory controller 302 receives a read request from a processor of the host system, 312. The memory controller generates a read command to service the read request from the host, 314. In one embodiment, the memory controller sets a logic value of the command to request internal check bits from the memory device, 316. The memory controller sends the read command to the memory device, 318.

In one embodiment, memory 304 receives and decodes the read command, 320. The decoding includes determine whether the command is set to request the internal check bits. The memory accesses the addressed data from the memory array(s), 322. In one embodiment, the memory performs error detection, 324. If there is no error in the read data, 326 NONE branch, the memory generates an error vector with check bits indicating no error, 328. If there is a single bit error, 326 SBE branch, in one embodiment the memory corrects the single bit error, 330. After the single bit error is corrected, the memory can generate an error vector with check bits indicating no error, 328.

If there is a multibit error, 326 MBE branch, in one embodiment the memory generates an indication of multibit error, 332. Whether generating an indication of multibit error or generating an error vector indicating no error, the memory returns the data and accompanying check bits to the memory controller, 334. The memory controller receives the data and check bits and uses the check bits for error correction, 336.

Figure 4:
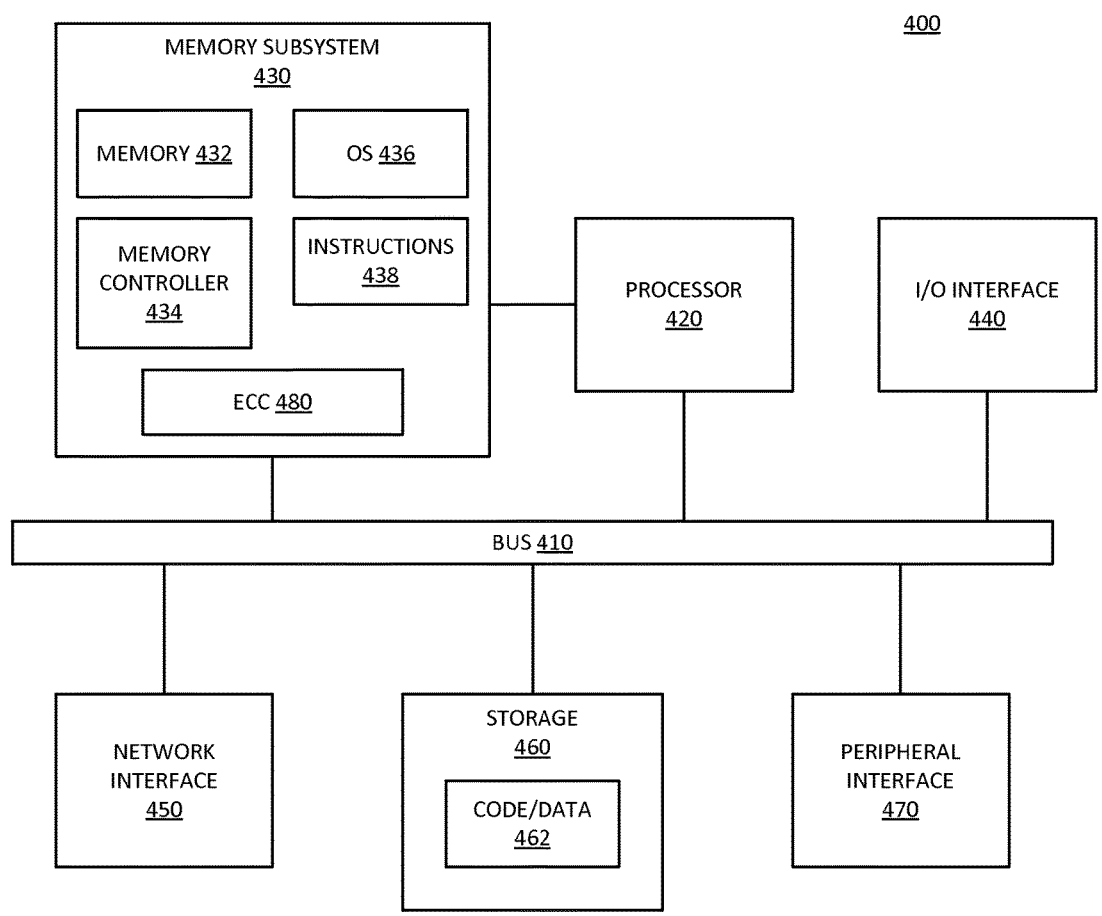
FIG. 4 is a block diagram of an embodiment of a computing system in which ECC with exchanged internal check bits can be implemented.

FIG. 4 is a block diagram of an embodiment of a computing system in which ECC with exchanged internal check bits is implemented. System 400 represents a computing device in accordance with any embodiment described herein, and can be a laptop computer, a desktop computer, a server, a gaming or entertainment control system, a scanner, copier, printer, routing or switching device, or other electronic device. System 400 includes processor 420, which provides processing, operation management, and execution of instructions for system 400. Processor 420 can include any type of microprocessor, central processing unit (CPU), processing core, or other processing hardware to provide processing for system 400. Processor 420 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 430 represents the main memory of system 400, and provides temporary storage for code to be executed by processor 420, or data values to be used in executing a routine. Memory subsystem 430 can include one or more memory devices such as read-only memory (ROM), flash memory, one or more varieties of random access memory (RAM), or other memory devices, or a combination of such devices. Memory subsystem 430 stores and hosts, among other things, operating system (OS) 436 to provide a software platform for execution of instructions in system 400. Additionally, other instructions 438 are stored and executed from memory subsystem 430 to provide the logic and the processing of system 400. OS 436 and instructions 438 are executed by processor 420. Memory subsystem 430 includes memory device 432 where it stores data, instructions, programs, or other items. In one embodiment, memory subsystem includes memory controller 434, which is a memory controller to generate and issue commands to memory device 432. It will be understood that memory controller 434 could be a physical part of processor 420.

Processor 420 and memory subsystem 430 are coupled to bus/bus system 410. Bus 410 is an abstraction that represents any one or more separate physical buses, communication lines/interfaces, and/or point-to-point connections, connected by appropriate bridges, adapters, and/or controllers. Therefore, bus 410 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 410 can also correspond to interfaces in network interface 450.

System 400 also includes one or more input/output (I/O) interface(s) 440, network interface 450, one or more internal mass storage device(s) 460, and peripheral interface 470 coupled to bus 410. I/O interface 440 can include one or more interface components through which a user interacts with system 400 (e.g., video, audio, and/or alphanumeric interfacing). Network interface 450 provides system 400 the ability to communicate with remote devices (e.g., servers, other computing devices) over one or more networks. Network interface 450 can include an Ethernet adapter, wireless interconnection components, USB (universal serial bus), or other wired or wireless standards-based or proprietary interfaces.

Storage 460 can be or include any conventional medium for storing large amounts of data in a nonvolatile manner, such as one or more magnetic, solid state, or optical based disks, or a combination. Storage 460 holds code or instructions and data 462 in a persistent state (i.e., the value is retained despite interruption of power to system 400). Storage 460 can be generically considered to be a "memory," although memory 430 is the executing or operating memory to provide instructions to processor 420. Whereas storage 460 is nonvolatile, memory 430 can include volatile memory (i.e., the value or state of the data is indeterminate if power is interrupted to system 400).

Peripheral interface 470 can include any hardware interface not specifically mentioned above. Peripherals refer generally to devices that connect dependently to system 400. A dependent connection is one where system 400 provides the software and/or hardware platform on which operation executes, and with which a user interacts.

In one embodiment, memory subsystem 430 includes ECC 480. ECC 480 is shown as a separate element, but represents internal ECC in memory devices 432 and system level ECC in memory controller 434. The internal ECC generates internal check bits after performing error detection and correction in response to a read request. The external ECC of memory controller 434 can use the check bits as metadata to augment error correction at the system level. In one embodiment, system 400 is a server device. In one embodiment in a server device, system 400 can be one of multiple systems combined together in a server configuration. For example, the server can be implemented as a blade server combined with other blade servers in a chassis system.

Figure 5:
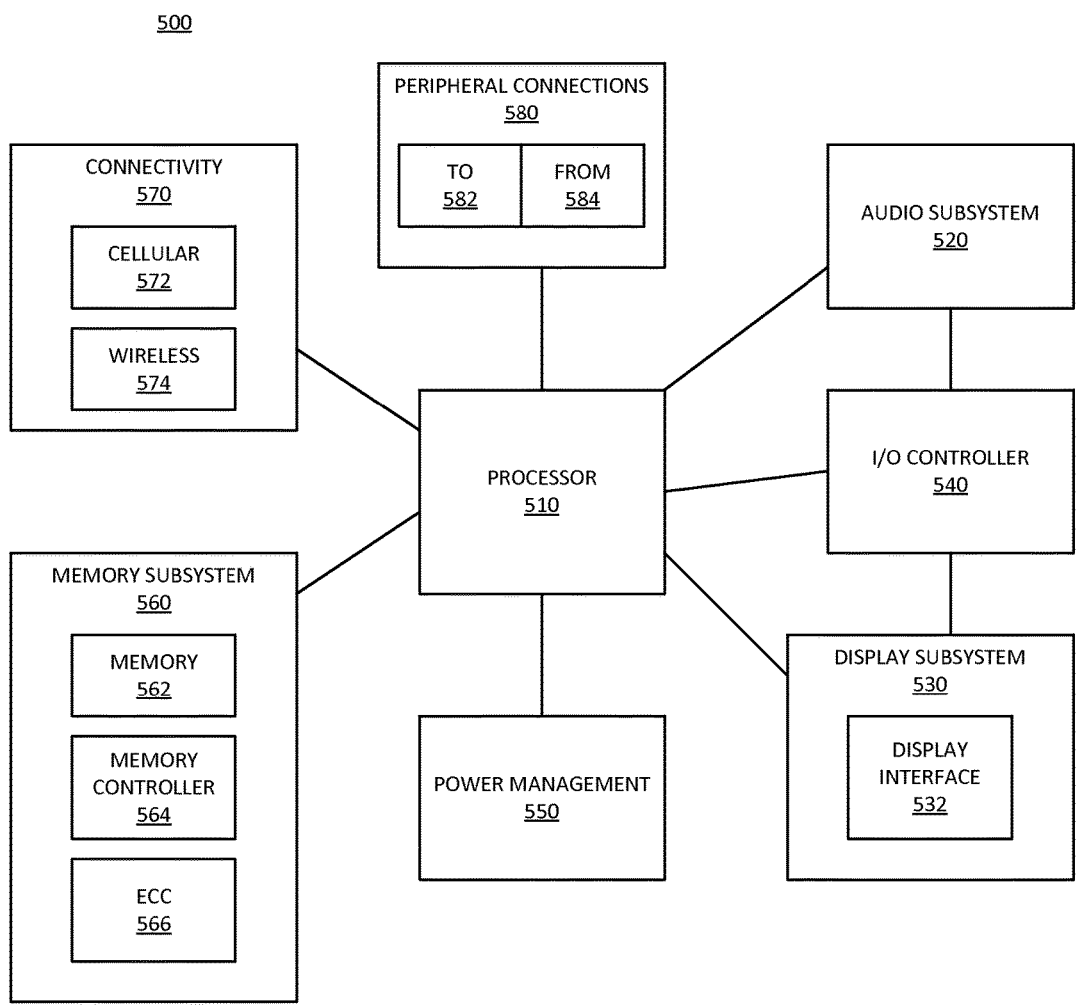
FIG. 5 is a block diagram of an embodiment of a mobile device in which ECC with exchanged internal check bits can be implemented.

FIG. 5 is a block diagram of an embodiment of a mobile device in which ECC with exchanged internal check bits is implemented. Device 500 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 500.

Device 500 includes processor 510, which performs the primary processing operations of device 500. Processor 510 can include one or more physical devices, such as microprocessors, application processors, microcontrollers, programmable logic devices, or other processing means. The processing operations performed by processor 510 include the execution of an operating platform or operating system on which applications and/or device functions are executed. The processing operations include operations related to I/O (input/output) with a human user or with other devices, operations related to power management, and/or operations related to connecting device 500 to another device. The processing operations can also include operations related to audio I/O and/or display I/O.

In one embodiment, device 500 includes audio subsystem 520, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 500, or connected to device 500. In one embodiment, a user interacts with device 500 by providing audio commands that are received and processed by processor 510.

Display subsystem 530 represents hardware (e.g., display devices) and software (e.g., drivers) components that provide a visual and/or tactile display for a user to interact with the computing device. Display subsystem 530 includes display interface 532, which includes the particular screen or hardware device used to provide a display to a user. In one embodiment, display interface 532 includes logic separate from processor 510 to perform at least some processing related to the display. In one embodiment, display subsystem 530 includes a touchscreen device that provides both output and input to a user. In one embodiment, display subsystem 530 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to device 500 through which a user might interact with the system. For example, devices that can be attached to device 500 might include microphone devices, speaker or stereo systems, video systems or other display device, keyboard or keypad devices, or other I/O devices for use with specific applications such as card readers or other devices.

As mentioned above, I/O controller 540 can interact with audio subsystem 520 and/or display subsystem 530. For example, input through a microphone or other audio device can provide input or commands for one or more applications or functions of device 500. Additionally, audio output can be provided instead of or in addition to display output. In another example, if display subsystem includes a touchscreen, the display device also acts as an input device, which can be at least partially managed by I/O controller 540. There can also be additional buttons or switches on device 500 to provide I/O functions managed by I/O controller 540.

In one embodiment, I/O controller 540 manages devices such as accelerometers, cameras, light sensors or other environmental sensors, gyroscopes, global positioning system (GPS), or other hardware that can be included in device 500. The input can be part of direct user interaction, as well as providing environmental input to the system to influence its operations (such as filtering for noise, adjusting displays for brightness detection, applying a flash for a camera, or other features). In one embodiment, device 500 includes power management 550 that manages battery power usage, charging of the battery, and features related to power saving operation.

Memory subsystem 560 includes memory device(s) 562 for storing information in device 500. Memory subsystem 560 can include nonvolatile (state does not change if power to the memory device is interrupted) and/or volatile (state is indeterminate if power to the memory device is interrupted) memory devices. Memory 560 can store application data, user data, music, photos, documents, or other data, as well as system data (whether long-term or temporary) related to the execution of the applications and functions of system 500. In one embodiment, memory subsystem 560 includes memory controller 564 (which could also be considered part of the control of system 500, and could potentially be considered part of processor 510). Memory controller 564 includes a scheduler to generate and issue commands to memory device 562.

Connectivity 570 includes hardware devices (e.g., wireless and/or wired connectors and communication hardware) and software components (e.g., drivers, protocol stacks) to enable device 500 to communicate with external devices. The external device could be separate devices, such as other computing devices, wireless access points or base stations, as well as peripherals such as headsets, printers, or other devices.

Connectivity 570 can include multiple different types of connectivity. To generalize, device 500 is illustrated with cellular connectivity 572 and wireless connectivity 574. Cellular connectivity 572 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 574 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 580 include hardware interfaces and connectors, as well as software components (e.g., drivers, protocol stacks) to make peripheral connections. It will be understood that device 500 could both be a peripheral device ("to" 582) to other computing devices, as well as have peripheral devices ("from" 584) connected to it. Device 500 commonly has a "docking" connector to connect to other computing devices for purposes such as managing (e.g., downloading and/or uploading, changing, synchronizing) content on device 500. Additionally, a docking connector can allow device 500 to connect to certain peripherals that allow device 500 to control content output, for example, to audiovisual or other systems.

In addition to a proprietary docking connector or other proprietary connection hardware, device 500 can make peripheral connections 580 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, memory subsystem 560 includes ECC 566. ECC 566 is shown as a separate element, but represents internal ECC in memory devices 562 and system level ECC in memory controller 564. The internal ECC generates internal check bits after performing error detection and correction in response to a read request. The external ECC of memory controller 564 can use the check bits as metadata to augment error correction at the system level.

In one aspect, a method for error correction in a memory subsystem includes: performing internal error detection in a memory device to detect errors in read data in response to a read request from an associated memory controller; selectively performing an internal error correction operation on the read data in response to detecting an error in the read data; generating check bits indicating an error vector for the read data after performing the internal error detection and correction; and providing the check bits with the read data to the memory controller in response to the read request, the check bits for use by the memory controller in additional error correction external to the memory device.

In one embodiment, generating the check bits indicating the error vector further comprises generating an error vector indicating no errors in response to detecting no errors in the read data. In one embodiment, generating the check bits indicating the error vector further comprises generating an error vector indicating no errors in response to detecting a single bit error in the read data, wherein the error correction operation further comprises performing single bit error correction. In one embodiment, generating the check bits indicating the error vector further comprises generating an error vector indicating an uncorrected error in response to detecting a multibit error in the read data, wherein the error correction operation further comprises detecting the multibit error. In one embodiment, providing the check bits with the read data comprises providing the check bits as metadata for a single device data correction (SDDC) error checking and correction (ECC) operation performed by the memory controller on the read data in connection with parallel read data from an additional memory device. In one embodiment, providing the check bits further comprises selectively providing the check bits in response to a logic value of an address bit in a Read column address strobe (CAS) command issued by the memory controller.

In one aspect, a memory device that applies internal error correction includes: error detection logic to perform internal error detection in a memory device to detect errors in read data in response to a read request from an associated memory controller; error correction logic to selectively perform an internal error correction operation on the read data in response to detecting an error in read data, and generate check bits indicating an error vector for the read data after performing internal error detection and correction; and I/O (input/output) hardware to transmit the check bits with the read data to the memory controller in response to the read request, the check bits for use by the memory controller in additional error correction external to the memory device.

In one embodiment, the error correction logic is to generate an error vector indicating no errors in response to detecting no errors in the read data. In one embodiment, the error correction logic is to generate an error vector indicating no errors in response to detecting a single bit error in the read data, wherein the error correction operation further comprises performing single bit error correction. In one embodiment, the error correction logic is to generate an error vector indicating an uncorrected error in response to detecting a multibit error in the read data, wherein the error correction operation further comprises detecting the multibit error. In one embodiment, the I/O hardware is to provide the read data with the check bits as metadata for a single device data correction (SDDC) error checking and correction (ECC) operation performed by the memory controller on the read data in connection with parallel read data from an additional memory device. In one embodiment, the I/O hardware is to selectively provide the check bits in response to a logic value of an address bit in a Read column address strobe (CAS) command issued by the memory controller.

In one aspect, a memory controller that performs error correction in a memory subsystem includes: C/A (command/address) logic to generate a Read command to an associated memory device, the Read command requesting internal check bits be returned with the read data; I/O (input/output) hardware coupled to the memory device to send the Read command to the memory device, to cause the memory device to perform internal error detection to detect errors in read data, selectively perform an internal error correction operation on the read data in response to detecting an error in read data, and generate check bits indicating an error vector for the read data after performing internal error detection and correction; and to receive the check bits with the read data in response to the read request; and error correction logic to access the check bits for additional error correction external to the memory device.

In one embodiment, the C/A logic is to generate a Read column address strobe (CAS) command with a logic value indicating the memory device to send the check bits. In one embodiment, the I/O hardware is to receive an error vector indicating an uncorrected error in response to detecting a multibit error in the read data. In one embodiment, the error correction logic is to access the check bits as metadata for a single device data correction (SDDC) error checking and correction (ECC) operation performed on the read data in connection with parallel read data from an additional memory device.

In one aspect, an electronic device with a memory subsystem includes: a memory controller to generate a Read command to read data from associated memory devices, the Read command including a request for internal check bits from an internal error correction operation performed at the memory devices in response to the Read command; multiple DRAMs (dynamic random access memory devices) each including a memory array of addressable memory locations, each, wherein the memory arrays are addressable according to multiple different levels of granularity, each DRAM including error detection logic to perform internal error detection to detect errors in read data in response to the Read command; error correction logic to selectively perform an internal error correction operation on the read data in response to detecting an error in read data, and generate check bits indicating an error vector for the read data after performing internal error detection and correction; and I/O (input/output) hardware to transmit the check bits with the read data to the memory controller in response to the read request; wherein the memory controller is to access the check bits for additional error correction external to the DRAM; and a chassis system to couple the memory subsystem to a blade server.

In one embodiment, the memory controller further includes C/A logic to generate a Read column address strobe (CAS) command with a logic value indicating the DRAM to send the check bits. In one embodiment, the DRAM error correction logic is to generate an error vector indicating an uncorrected error in response to detecting a multibit error in the read data. In one embodiment, the memory controller further includes error correction logic to access the check bits as metadata for a single device data correction (SDDC) error checking and correction (ECC) operation performed on the read data in connection with parallel read data from an additional memory device.

In one aspect, a method for error correction in a memory subsystem includes: generating a Read command to an associated memory device, the Read command requesting internal check bits be returned with the read data; sending the Read command to the memory device, to cause the memory device to perform internal error detection to detect errors in read data, selectively perform an internal error correction operation on the read data in response to detecting an error in read data, and generate check bits indicating an error vector for the read data after performing internal error detection and correction; and to receive the check bits with the read data in response to the read request; and accessing the check bits for additional error correction external to the memory device.

In one embodiment, generating the Read command further comprises generating a Read column address strobe (CAS) command with a logic value indicating the memory device to send the check bits. In one embodiment, accessing the check bits indicating the error vector further comprises accessing an error vector indicating no errors in response to detecting no errors in the read data. In one embodiment, accessing the check bits indicating the error vector further comprises accessing an error vector indicating no errors in response to detecting a single bit error in the read data, and further comprising performing single bit error correction. In one embodiment, accessing the check bits indicating the error vector further comprises accessing an error vector indicating an uncorrected error in response to detecting a multibit error in the read data, and further comprising detecting the multibit error. In one embodiment, accessing the check bits with the read data comprises accessing the check bits as metadata for a single device data correction (SDDC) error checking and correction (ECC) operation performed on the read data in connection with parallel read data from an additional memory device.

In one aspect, an apparatus for error correction in a memory subsystem includes: means for performing internal error detection in a memory device to detect errors in read data in response to a read request from an associated memory controller; means for selectively performing an internal error correction operation on the read data in response to detecting an error in the read data; means for generating check bits indicating an error vector for the read data after performing the internal error detection and correction; and means for providing the check bits with the read data to the memory controller in response to the read request, the check bits for use by the memory controller in additional error correction external to the memory device.

In one embodiment, the means for generating the check bits indicating the error vector further comprises means for generating an error vector indicating no errors in response to detecting no errors in the read data. In one embodiment, the means for generating the check bits indicating the error vector further comprises means for generating an error vector indicating no errors in response to detecting a single bit error in the read data, wherein the error correction operation further comprises performing single bit error correction. In one embodiment, the means for generating the check bits indicating the error vector further comprises means for generating an error vector indicating an uncorrected error in response to detecting a multibit error in the read data, wherein the error correction operation further comprises detecting the multibit error. In one embodiment, the means for providing the check bits with the read data comprises means for providing the check bits as metadata for a single device data correction (SDDC) error checking and correction (ECC) operation performed by the memory controller on the read data in connection with parallel read data from an additional memory device. In one embodiment, the means for providing the check bits further comprises means for selectively providing the check bits in response to a logic value of an address bit in a Read column address strobe (CAS) command issued by the memory controller.

In one aspect, an article of manufacture comprising a computer readable storage medium having content stored thereon, which when accessed provides instructions for performing operations including: performing internal error detection in a memory device to detect errors in read data in response to a read request from an associated memory controller; selectively performing an internal error correction operation on the read data in response to detecting an error in the read data; generating check bits indicating an error vector for the read data after performing the internal error detection and correction; and providing the check bits with the read data to the memory controller in response to the read request, the check bits for use by the memory controller in additional error correction external to the memory device.

In one embodiment, the content for generating the check bits indicating the error vector further comprises content for generating an error vector indicating no errors in response to detecting no errors in the read data. In one embodiment, the content for generating the check bits indicating the error vector further comprises content for generating an error vector indicating no errors in response to detecting a single bit error in the read data, wherein the error correction operation further comprises performing single bit error correction. In one embodiment, the content for generating the check bits indicating the error vector further comprises content for generating an error vector indicating an uncorrected error in response to detecting a multibit error in the read data, wherein the error correction operation further comprises detecting the multibit error. In one embodiment, the content for providing the check bits with the read data comprises content for providing the check bits as metadata for a single device data correction (SDDC) error checking and correction (ECC) operation performed by the memory controller on the read data in connection with parallel read data from an additional memory device. In one embodiment, the content for providing the check bits further comprises content for selectively providing the check bits in response to a logic value of an address bit in a Read column address strobe (CAS) command issued by the memory controller.

In one aspect, an apparatus for error correction in a memory subsystem includes: means for generating a Read command to an associated memory device, the Read command requesting internal check bits be returned with the read data; means for sending the Read command to the memory device, to cause the memory device to perform internal error detection to detect errors in read data, selectively perform an internal error correction operation on the read data in response to detecting an error in read data, and generate check bits indicating an error vector for the read data after performing internal error detection and correction; and to receive the check bits with the read data in response to the read request; and means for accessing the check bits for additional error correction external to the memory device.

In one embodiment, the means for generating the Read command further comprises means for generating a Read column address strobe (CAS) command with a logic value indicating the memory device to send the check bits. In one embodiment, the means for accessing the check bits indicating the error vector further comprises means for accessing an error vector indicating no errors in response to detecting no errors in the read data. In one embodiment, the means for accessing the check bits indicating the error vector further comprises means for accessing an error vector indicating no errors in response to detecting a single bit error in the read data, and further comprising means for performing single bit error correction. In one embodiment, the means for accessing the check bits indicating the error vector further comprises means for accessing an error vector indicating an uncorrected error in response to detecting a multibit error in the read data, and further comprising means for detecting the multibit error. In one embodiment, the means for accessing the check bits with the read data comprises means for accessing the check bits as metadata for a single device data correction (SDDC) error checking and correction (ECC) operation performed on the read data in connection with parallel read data from an additional memory device.

In one aspect, an article of manufacture comprising a computer readable storage medium having content stored thereon, which when accessed provides instructions for performing operations including: generating a Read command to an associated memory device, the Read command requesting internal check bits be returned with the read data; sending the Read command to the memory device, to cause the memory device to perform internal error detection to detect errors in read data, selectively perform an internal error correction operation on the read data in response to detecting an error in read data, and generate check bits indicating an error vector for the read data after performing internal error detection and correction; and to receive the check bits with the read data in response to the read request; and accessing the check bits for additional error correction external to the memory device.

In one embodiment, the content for generating the Read command further comprises content for generating a Read column address strobe (CAS) command with a logic value indicating the memory device to send the check bits. In one embodiment, the content for accessing the check bits indicating the error vector further comprises content for accessing an error vector indicating no errors in response to detecting no errors in the read data. In one embodiment, the content for accessing the check bits indicating the error vector further comprises content for accessing an error vector indicating no errors in response to detecting a single bit error in the read data, and further comprising content for performing single bit error correction. In one embodiment, the content for accessing the check bits indicating the error vector further comprises content for accessing an error vector indicating an uncorrected error in response to detecting a multibit error in the read data, and further comprising content for detecting the multibit error. In one embodiment, the content for accessing the check bits with the read data comprises content for accessing the check bits as metadata for a single device data correction (SDDC) error checking and correction (ECC) operation performed on the read data in connection with parallel read data from an additional memory device.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for error correction in a memory subsystem, comprising:
    performing internal error detection in a memory device to detect errors in read data in response to a read request from an associated memory controller, the internal error detection to be performed with internal check bits generated within the memory device;
    selectively performing an internal error correction operation on the read data in response to detecting an error in the read data with the internal check bits;
    generating check bits indicating an error vector for the read data to compare against the internal check bits for performing the internal error detection and correction; and
    providing the check bits with the read data to the associated memory controller in response to the read request, the check bits for use by the associated memory controller in additional error correction external to the memory device.

2. The method of claim 1, wherein generating the check bits indicating the error vector further comprises generating an error vector indicating no errors in response to detecting no errors in the read data.

3. The method of claim 1, wherein generating the check bits indicating the error vector further comprises generating an error vector indicating no errors in response to detecting a single bit error in the read data, wherein the internal error correction operation further comprises performing single bit error correction.

4. The method of claim 1, wherein generating the check bits indicating the error vector further comprises generating an error vector indicating an uncorrected error in response to detecting a multibit error in the read data, wherein the internal error correction operation further comprises detecting the multibit error.

5. The method of claim 1, wherein providing the check bits with the read data comprises providing the check bits as metadata for a single device data correction (SDDC) error checking and correction (ECC) operation performed by the associated memory controller on the read data in connection with parallel read data from an additional memory device.

6. The method of claim 1, wherein providing the check bits further comprises selectively providing the check bits in response to a logic value of an address bit in a Read column address strobe (CAS) command issued by the associated memory controller.

7. A memory device that applies internal error correction, comprising:
    an error detection circuit to perform internal error detection in a memory device to detect errors in read data in response to a read request from an associated memory controller, the internal error detection to be performed with internal check bits generated within the memory device;
    an error correction circuit to selectively perform an internal error correction operation on the read data in response to detection of an error in read data with the internal check bits, and generate check bits to indicate an error vector for the read data to compare against the internal check bits for performance internal error detection and correction; and
    I/O (input/output) hardware to transmit the check bits with the read data to the associated memory controller in response to the read request, the check bits for use by the associated memory controller in additional error correction external to the memory device.

8. The memory device of claim 7, wherein the error correction circuit is to generate an error vector to indicate no errors in response to detection of no errors in the read data.

9. The memory device of claim 7, wherein the error correction circuit is to generate an error vector to indicate no errors in response to detection of a single bit error in the read data, wherein internal error correction operation further comprises performance of single bit error correction.

10. The memory device of claim 7, wherein the error correction circuit is to generate an error vector to indicate an uncorrected error in response to detection of a multibit error in the read data, wherein internal error correction operation further comprises detection of the multibit error.

11. The memory device of claim 7, wherein the I/O hardware is to provide the read data with the check bits as metadata for a single device data correction (SDDC) error checking and correction (ECC) operation performed by the associated memory controller on the read data in connection with parallel read data from an additional memory device.

12. The memory device of claim 7, wherein the I/O hardware is to selectively provide the check bits in response to a logic value of an address bit in a Read column address strobe (CAS) command issued by the associated memory controller.

13. An electronic device with a memory subsystem, comprising:
    a memory controller to generate a Read command to read data from associated memory devices, the Read command including a request for internal check bits from an internal error correction operation performed at the associated memory devices in response to the Read command;
    multiple DRAM (dynamic random access memory) devices each including a memory array of addressable memory locations, wherein the memory arrays are addressable according to multiple different levels of granularity, the DRAM devices including
        an error detection circuit to perform internal error detection to detect errors in read data in response to the Read command, the internal error detection to be performed with internal check bits generated within the DRAM device;
        an error correction circuit to selectively perform an internal error correction operation on the read data in response to detection of an error in read data with the internal check bits, and generate check bits to indicate an error vector for the read data to compare against the internal check bits for performance of internal error detection and correction; and I/O (input/output) hardware to transmit the check bits with the read data to the memory controller in response to the Read command including the request for internal check bits;
wherein the memory controller is to access the check bits for additional error correction external to the DRAM devices; and
a chassis system to couple the memory subsystem to a blade server.

14. The electronic device of claim 13, wherein the memory controller further includes C/A logic to generate a Read column address strobe (CAS) command with a logic value to indicate the DRAM device to send the check bits.

15. The electronic device of claim 13, wherein DRAM error correction logic is to generate an error vector to indicate an uncorrected error in response to detection of a multibit error in the read data.

16. The electronic device of claim 13, wherein the memory controller further includes error correction logic to access the check bits as metadata for a single device data correction (SDDC) error checking and correction (ECC) operation performed on the read data in connection with parallel read data from an additional memory device.

* * * * *